(12) United States Patent
Feldmann et al.

(10) Patent No.: US 9,405,699 B1
(45) Date of Patent: Aug. 2, 2016

(54) SYSTEMS AND METHODS FOR OPTIMIZING COMPUTER PERFORMANCE

(71) Applicant: Dell Software Inc., Aliso Viejo, CA (US)

(72) Inventors: Christine Feldmann, Mississauga (CA); Gordon H. Tyler, Mississauga (CA)

(73) Assignee: Dell Software Inc., Aliso Viejo, CA (US)

( * ) Notice: Subject to any disclaimer, the term of this patent is extended or adjusted under 35 U.S.C. 154(b) by 167 days.

(21) Appl. No.: 14/472,329

(22) Filed: Aug. 28, 2014

(51) Int. Cl.
*G06F 12/10* (2016.01)
*G06F 17/30* (2006.01)
*G06F 12/08* (2016.01)

(52) U.S. Cl.
CPC ........ *G06F 12/1018* (2013.01); *G06F 12/0864* (2013.01); *G06F 17/3033* (2013.01); *G06F 17/30628* (2013.01); *G06F 17/30949* (2013.01); *G06F 2212/6042* (2013.01)

(58) Field of Classification Search
None
See application file for complete search history.

(56) References Cited

U.S. PATENT DOCUMENTS

| | | | |
|---|---|---|---|
| 7,373,480 B2 | 5/2008 | Cypher | |
| 8,429,143 B2 | 4/2013 | Ellison et al. | |
| 2003/0009482 A1* | 1/2003 | Benerjee | G06F 9/5016 |
| 2010/0211573 A1* | 8/2010 | Sekiguchi | G06F 17/30336 707/747 |
| 2011/0283082 A1* | 11/2011 | McKenney | G06F 12/1018 711/202 |
| 2012/0036134 A1 | 2/2012 | Malakhov | |
| 2012/0323970 A1* | 12/2012 | Larson | G06F 17/30949 707/800 |
| 2012/0323972 A1* | 12/2012 | Ostrovsky | G06F 17/30348 707/803 |

OTHER PUBLICATIONS

Stack Overflow, "Chosing a Suitable Table Size for a Hash," http://stackoverflow.com, Nov. 13, 2008, 2 pages.
Griswold, William G. et al., "The Design and Implementation of Dynamic Hashing for Sets and Tables in Icon," Software-Practice and Experience, vol. 23(4), Apr. 1993, pp. 351-367.

* cited by examiner

*Primary Examiner* — Michael Krofcheck
(74) *Attorney, Agent, or Firm* — Winstead PC (57) ABSTRACT

In one embodiment, a method includes initiating execution of an application, the application utilizing a hash table data structure to map a plurality of keys to a plurality of values. The method further includes, the application checking a memory for a cached hash table capacity indicator from a previous run of the application. In addition, the method includes, responsive to no cached hash table capacity indicator being found in the memory: creating a first hash table with an initial capacity; populating the first hash table with a plurality of runtime entries; determining an improved hash table capacity based, at least in part, on a quantity of the plurality of runtime entries; creating a second hash table with the improved hash table capacity; copying the plurality of runtime entries to the second hash table; and the application using the second hash table in place of the first hash table.

20 Claims, 3 Drawing Sheets

SYSTEMS AND METHODS FOR OPTIMIZING COMPUTER PERFORMANCE

BACKGROUND

1. Technical Field

The present disclosure relates generally to computers and more particularly, but not by way of limitation, to systems and methods for optimizing computer performance.

2. History of Related Art

Software applications often store and organize data using data structures such as linked lists, hash tables, trees, etc. For any given software application, selection of a data structure to contain particular data typically involves weighing performance considerations such as, among other things, storage efficiency, desired data operations, a time complexity of the desired data operations, and available computing resources. Some data structures require that a certain amount of memory be allocated at a time of data-structure instantiation. In many cases, however, memory requirements are not known at the time of instantiation.

Moreover, as the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment, a method is performed by a computer system comprising computer hardware. The method includes initiating execution of an application in an execution environment of the computer system, the application utilizing a hash table data structure to map a plurality of keys to a plurality of values. The method further includes, during the execution, the application checking a memory for a cached hash table capacity indicator from a previous run of the application in the execution environment. In addition, the method includes, responsive to no cached hash table capacity indicator being found in the memory: creating a first hash table with an initial capacity; populating the first hash table with a plurality of runtime entries; determining an improved hash table capacity based, at least in part, on a quantity of the plurality of runtime entries, such that the improved hash table capacity is a reduced capacity relative to the initial capacity; creating a second hash table with the improved hash table capacity; copying the plurality of runtime entries to the second hash table; and the application using the second hash table in place of the first hash table.

In one embodiment, an information handling system includes a processing unit, wherein the processing unit is operable to implement a method. The method includes initiating execution of an application in an execution environment of the computer system, the application utilizing a hash table data structure to map a plurality of keys to a plurality of values. The method further includes, during the execution, the application checking a memory for a cached hash table capacity indicator from a previous run of the application in the execution environment. In addition, the method includes, responsive to no cached hash table capacity indicator being found in the memory: creating a first hash table with an initial capacity; populating the first hash table with a plurality of runtime entries; determining an improved hash table capacity based, at least in part, on a quantity of the plurality of runtime entries, such that the improved hash table capacity is a reduced capacity relative to the initial capacity; creating a second hash table with the improved hash table capacity; copying the plurality of runtime entries to the second hash table; and the application using the second hash table in place of the first hash table.

In one embodiment, a computer-program product includes a non-transitory computer-usable medium having computer-readable program code embodied therein. The computer-readable program code is adapted to be executed to implement a method. The method includes initiating execution of an application in an execution environment of the computer system, the application utilizing a hash table data structure to map a plurality of keys to a plurality of values. The method further includes, during the execution, the application checking a memory for a cached hash table capacity indicator from a previous run of the application in the execution environment. In addition, the method includes, responsive to no cached hash table capacity indicator being found in the memory: creating a first hash table with an initial capacity; populating the first hash table with a plurality of runtime entries; determining an improved hash table capacity based, at least in part, on a quantity of the plurality of runtime entries, such that the improved hash table capacity is a reduced capacity relative to the initial capacity; creating a second hash table with the improved hash table capacity; copying the plurality of runtime entries to the second hash table; and the application using the second hash table in place of the first hash table.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS

During execution, a software application may create, or instantiate, various data structures to contain particular data. One example of such a data structure is a hash table. In addition to having its ordinary meaning, a hash table may be considered to include a data structure that maps a plurality of keys to a plurality of values via a hash function. Each key/value pair may be considered a hash table entry. In some implementations, an instance of a hash table is created using certain initialization parameters such as an initial capacity and a load factor. The initial capacity may be a number of buckets, or blocks, in the hash table. The load factor may be an indicator of how full the hash table is allowed to become before its capacity is automatically increased via rehashing.

In many cases, it may not be known, at the time the hash table is instantiated, how many entries the hash table will have. After instantiation, the hash table may be populated with runtime entries that are particular to an execution environment. The quantity of runtime entries can be highly variable. For example, the software application may be used for a variety of different clients or customers that use the software application in different ways, have different requirements, and/or the like. Thus, it may not be known how to best set the initial capacity of the hash table for the execution environment.

One example of such a software application is an agent used for profiling or monitoring a target computer program. This profiling can include memory analysis, performance analysis, and/or coverage analysis of the target computer program, among other features. According to this example, the agent may instrument, for example, one or more routines of the target computer program. For instance, if the target computer program is expressed in JAVA, the agent may instrument each method of each class. In an example, the agent may store information related to each class that is instrumented as an entry in a hash table. However, according to this example, it may not be known at the time of instantiation of the hash table how many classes will be instrumented. Thus, in similar fashion to the description above, an appropriate size of the hash table can depend on the execution environment of the agent. According to this example, the execution environment can include one or more of an information handling system on which the agent is executed, the target computer program being executed, and/or other systems or components.

One approach for addressing the above-described sizing problem is to allow dynamic resizing to occur via rehashing. For example, in some implementations, a particular hash table may be rehashed when the number of entries in the hash table exceeds the product of the load factor and the current capacity. As part of rehashing, structures internal to the particular hash table (e.g., a backing array) can be rebuilt so that the hash table has, for example, approximately twice the number of buckets or blocks. However, relying exclusively on rehashing to correctly size the particular hash table can have certain disadvantages. Rehashing can be computationally expensive and thus adversely affect hash table operations and overall computer performance. Oftentimes, repeated rehashing may occur if the initial capacity is grossly deficient, thereby further aggravating the problem. Another approach for addressing the above-described sizing problem is to give the particular hash table an initial capacity that is deemed large enough to prevent any need to rehash. However, this approach wastes memory and increases iteration time over collection views of the hash table, thereby adversely affecting performance of the application. In many cases, such a large capacity may not be needed.

The present disclosure describes examples of optimally sizing a data structure such as a hash table. In certain embodiments, upon an initial run of a software application in a given execution environment, a temporary hash table can be created, or instantiated, with an initial capacity that is large enough to meet, for example, most or all anticipated needs. In certain embodiments, an improved hash table capacity can be determined based, at least in part, on a number of runtime entries with which the temporary hash table is populated during execution. Subsequently, in many cases, a second hash table can be created, or instantiated, with the improved hash table capacity. Advantageously, in certain embodiments, memory utilization can thereby be optimized and repetitive rehashing can be avoided. In addition, in various embodiments, an indicator of the improved hash table capacity can be stored. Advantageously, in certain embodiments, the indicator can be accessed and used in subsequent executions of the software application in the execution environment to optimally size a hash table at the time of instantiation.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
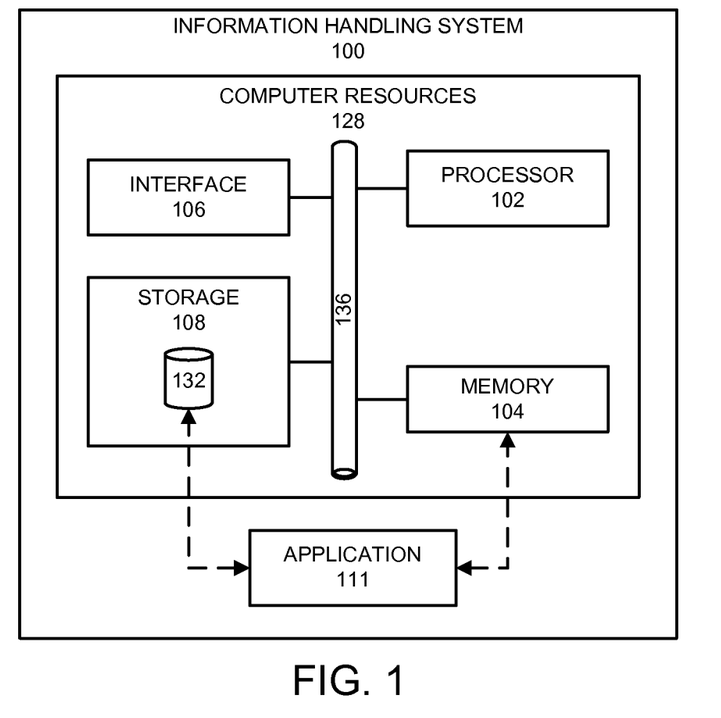
FIG. 1 illustrates an example of an information handling system.

FIG. 1 illustrates an example of an information handling system 100. The information handling system 100 includes an application 111 operable to execute on computer resources 128. In particular embodiments, the information handling system 100 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the information handling system 100 may comprise any suitable physical form, configuration, number, type and/or layout. As an example, and not by way of limitation, the information handling system 100 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the information handling system 100 may include one or more computer systems; be unitary or distributed; span multiple locations; span multiple machines; or reside in a cloud, which may include one or more cloud components in one or more networks.

In the depicted embodiment, the information handling system 100 includes a processor 102, memory 104, storage 108, interface 106, and bus 136. Although a particular information handling system is depicted having a particular number of particular components in a particular arrangement, this disclosure contemplates any suitable information handling system having any suitable number of any suitable components in any suitable arrangement.

Processor 102 may be a microprocessor, controller, or any other suitable computing device, resource, or combination of hardware, software and/or encoded logic operable to execute, either alone or in conjunction with other components, (e.g., memory 104), the application 111. Such functionality may include providing various features discussed herein. In particular embodiments, processor 102 may include hardware for executing instructions, such as those making up the application 111. As an example and not by way of limitation, to execute instructions, processor 102 may retrieve (or fetch) instructions from an internal register, an internal cache, memory 104, or storage 108; decode and execute them; and then write one or more results to an internal register, an internal cache, memory 104, or storage 108.

In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 108 and the instruction caches may speed up retrieval of those instructions by processor 102. Data in the data caches may be copies of data in memory 104 or storage 108 for instructions executing at processor 102 to operate on; the results of previous instructions executed at processor 102 for access by subsequent instructions executing at processor 102, or for writing to memory 104, or storage 108; or other suitable data. The data caches may speed up read or write operations by processor 102. The TLBs may speed up virtual-address translations for processor 102. In particular embodiments, processor 102 may include one or more internal registers for data, instructions, or addresses. Depending on the embodiment, processor 102 may include any suitable number of any suitable internal registers, where appropriate. Where appropriate, processor 102 may include one or more arithmetic logic units (ALUs); be a multi-core processor; include one or more processors 102; or any other suitable processor.

Memory 104 may be any form of volatile or non-volatile memory including, without limitation, magnetic media, optical media, random access memory (RAM), read-only memory (ROM), flash memory, removable media, or any other suitable local or remote memory component or components. In particular embodiments, memory 104 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 104 may include one or more memories 104, where appropriate. Memory 104 may store any suitable data or information utilized by the information handling system 100, including software embedded in a computer readable medium, and/or encoded logic incorporated in hardware or otherwise stored (e.g., firmware). In particular embodiments, memory 104 may include main memory for storing instructions for processor 102 to execute or data for processor 102 to operate on. In particular embodiments, one or more memory management units (MMUs) may reside between processor 102 and memory 104 and facilitate accesses to memory 104 requested by processor 102.

As an example and not by way of limitation, the information handling system 100 may load instructions from storage 108 or another source (such as, for example, another computer system) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 may execute only instructions in one or more internal registers or internal caches or in memory 104 (as opposed to storage 108 or elsewhere) and may operate only on data in one or more internal registers or internal caches or in memory 104 (as opposed to storage 108 or elsewhere).

In particular embodiments, storage 108 may include mass storage for data or instructions. As an example and not by way of limitation, storage 108 may include a hard disk drive (HDD), a floppy disk drive, flash memory, an optical disc, a magneto-optical disc, magnetic tape, or a Universal Serial Bus (USB) drive or a combination of two or more of these. Storage 108 may include removable or non-removable (or fixed) media, where appropriate. Storage 108 may be internal or external to the information handling system 100, where appropriate. In particular embodiments, storage 108 may be non-volatile, solid-state memory. In particular embodiments, storage 108 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 108 may take any suitable physical form and may comprise any suitable number or type of storage. Storage 108 may include one or more storage control units facilitating communication between processor 102 and storage 108, where appropriate.

In particular embodiments, interface 106 may include hardware, encoded software, or both providing one or more interfaces for communication (such as, for example, packet-based communication) among any networks, any network devices, and/or any other computer systems. As an example and not by way of limitation, communication interface 106 may include a network interface controller (NIC) or network adapter for communicating with an Ethernet or other wire-based network and/or a wireless NIC (WNIC) or wireless adapter for communicating with a wireless network.

Depending on the embodiment, interface 106 may be any type of interface suitable for any type of network for which information handling system 100 is used. As an example and not by way of limitation, information handling system 100 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 100 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The information handling system 100 may include any suitable interface 106 for any one or more of these networks, where appropriate.

In some embodiments, interface 106 may include one or more interfaces for one or more I/O devices. One or more of these I/O devices may enable communication between a person and the information handling system 100. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 106 for them. Where appropriate, interface 106 may include one or more drivers enabling processor 102 to drive one or more of these I/O devices. Interface 106 may include one or more interfaces 106, where appropriate.

Bus 136 may include any combination of hardware, software embedded in a computer readable medium, and/or encoded logic incorporated in hardware or otherwise stored (e.g., firmware) to couple components of the information handling system 100 to each other. As an example and not by way of limitation, bus 136 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 136 may include any number, type, and/or configuration of buses 136, where appropriate. In particular embodiments, one or more buses 136 (which may each include an address bus and a data bus) may couple processor 102 to memory 104. Bus 136 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 102 (such as, for example, one or more internal registers or caches), one or more portions of memory 104, one or more portions of storage 108, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

In certain embodiments, the application 111 is operable to execute on the information handling system 100 in the fashion described above. In some embodiments, the application 111 can be an agent that instruments a target program as described above. The application 111 can create instances of data structures such as, for example, hash tables, in the memory 104. In certain embodiments, the application 111 is operable to establish, or update, an application cache 132 during a run in an execution environment. In general, the execution environment of the application 111 can include the information handling system 100, data or computer programs to be operated on by the application 111 during execution, and/or other components or runtime conditions. The application cache 132 can be represented, for example, in a database, flat file, and/or the like.

More particularly, the application cache 132 can be used to persistently store, for example, a size indicator for a data structure such as a hash table. For example, during an initial run in the execution environment, the application cache 132 may be non-existent or empty. During the initial run, the application 111 can determine an improved or optimized hash table capacity and store an indicator of the improved hash table capacity in the application cache 132. The indicator can be updated during execution. Example interoperability of the application 111 and the application cache 132 will be described in greater detail with respect to FIGS. 2-3.

Figure 2:
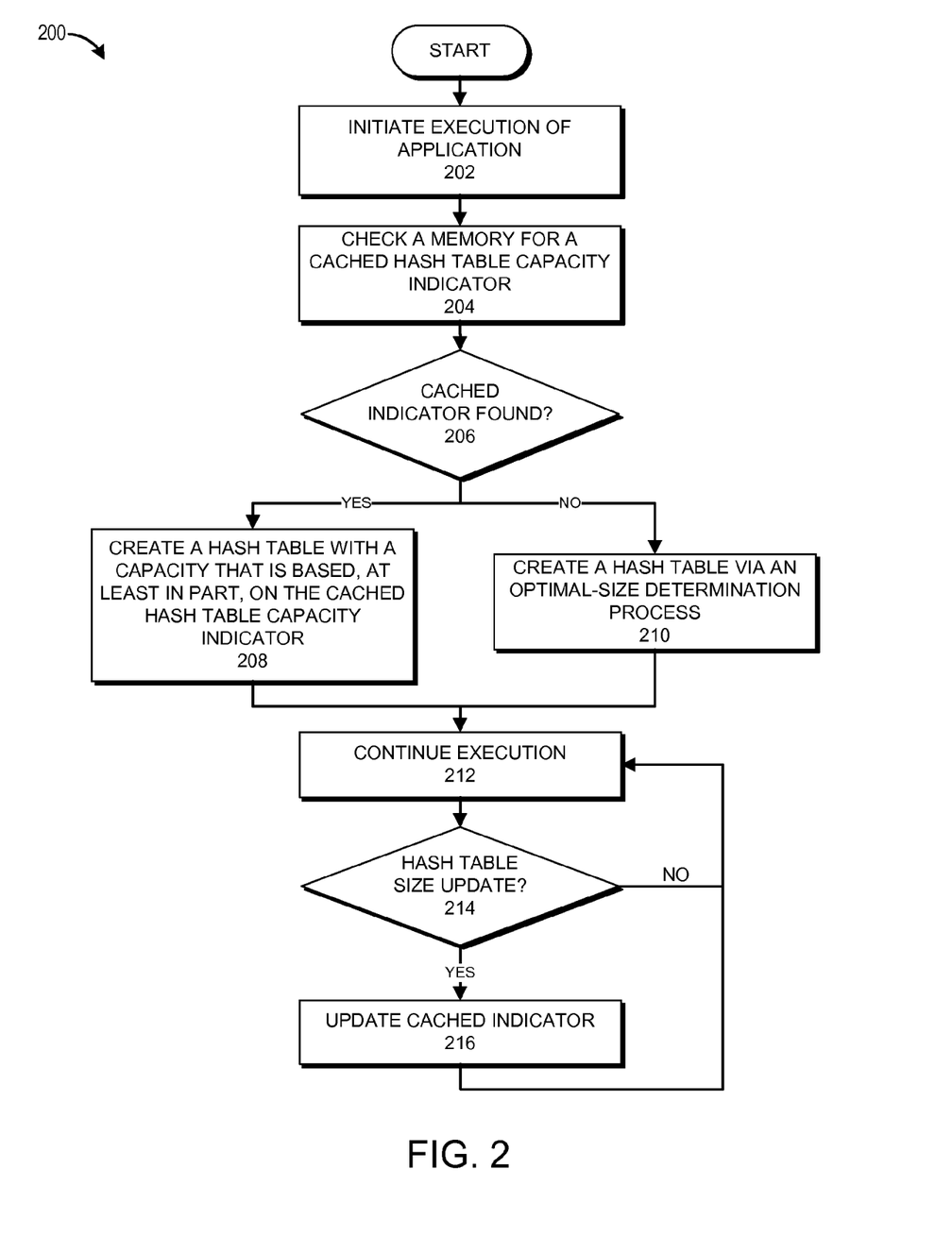
FIG. 2 illustrates an example of a process for optimizing hash table size.

FIG. 2 illustrates an example of a process 200 for optimizing hash table size. The process 200 can be implemented by any system that can execute software applications. Although any number of systems, in whole or in part, can implement the process 200, to simplify discussion, the process 200 will be described in relation to the information handling system 100 of FIG. 1.

At block 202, the information handling system 100 initiates execution of the application 111. At block 204, the application 111 checks a memory such as, for example, the application cache 132, for a cached hash table capacity indicator. In some embodiments, the decision block 204 can include determining whether the application cache 132 has been established. In some embodiments, the existence of a cached hash table capacity indicator in the application cache means that the application 111 has previously executed in the execution environment. In some cases, such as upon an initial run of the application 111, the application cache 132 may be nonexistent or empty. In other cases, even if the application cache 132 is nonempty, it may lack a hash table capacity indicator for the execution environment.

At decision block 206, the application 111 determines whether a cached hash table capacity indicator for the execution environment has been found. If so, at block 208, the application 211 creates, or instantiates, a hash table with an initial capacity that is based, at least in part, on the cached hash table capacity indicator. For example, in some embodiments, the cached hash table capacity indicator may be a specified number of buckets or blocks. In such cases, the specified number can be used as the initial capacity of the hash table. The application 211 may also establish a load factor for the hash table (e.g., 0.75). The hash table can be created, for example, in the memory 104.

If it is determined at the decision block 206 that a cached hash table capacity indicator has not been found, at block 210, the application 111 creates a hash table via an optimal-size determination process. In general, the block 210 can include updating the application cache 132 to include a cached hash table capacity indicator. In many cases, the block 210 can include establishing the application cache 132. An example of functionality that can be performed at the block 210 will be described with respect to FIG. 3.

At block 212, the application 111 continues execution. At decision block 214, the application 111 determines whether a hash table size update should occur. In certain embodiments, the application 111 can periodically update the cached hash table capacity indicator based on, for example, runtime changes to a number of entries in the hash table. In some embodiments, the update can occur at certain time intervals, responsive to an update to the hash table, and/or responsive to other runtime events or conditions. In some embodiments, the blocks 214-216 can be omitted, modified such that, for example, only a single update occurs during execution of the application 111, and/or the like. In a typical embodiment, the process 200 continues to execute blocks 212-216 as described above until execution concludes or is terminated or other stop criteria is met.

Figure 3:
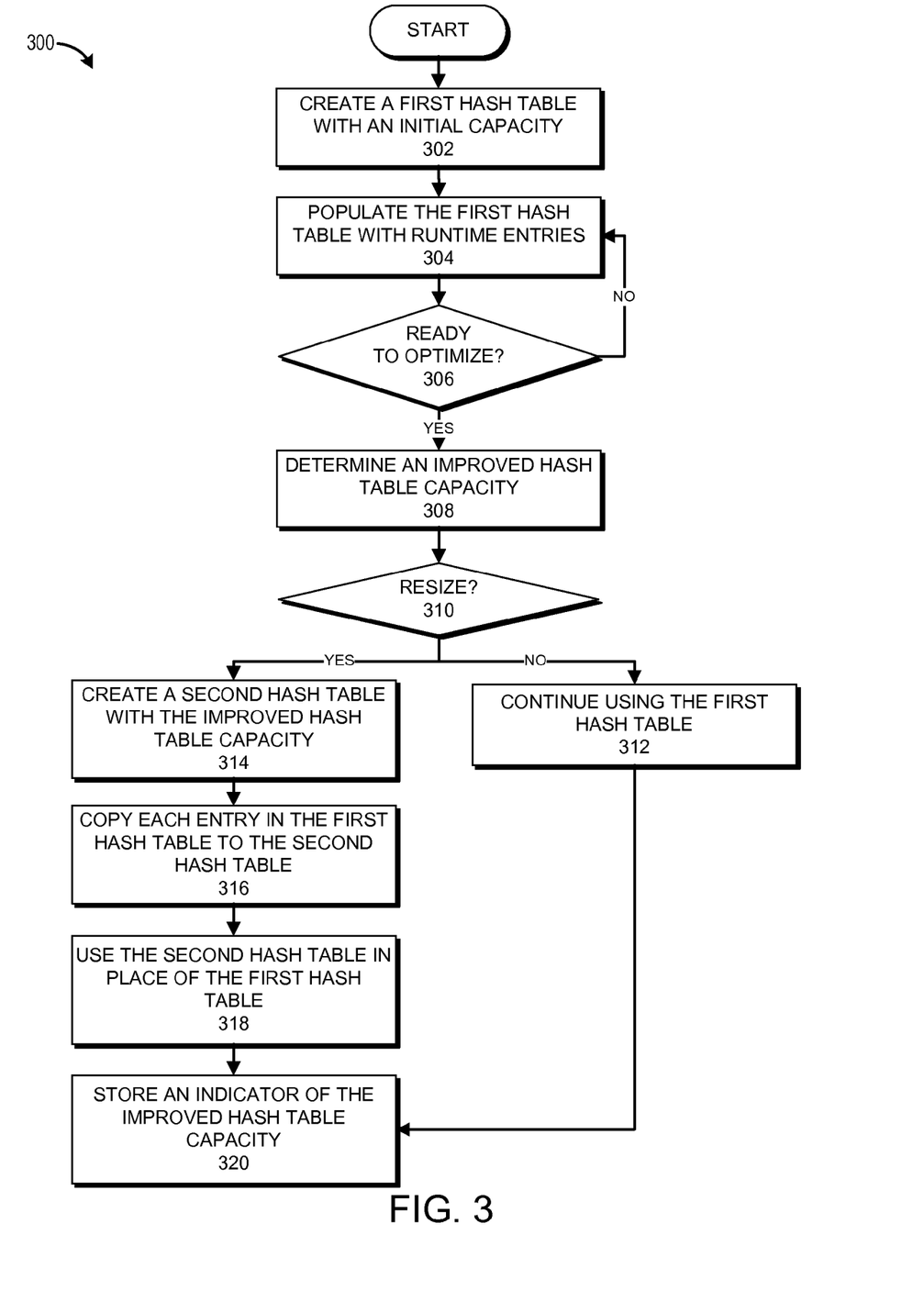
FIG. 3 illustrates an example of a process for creating a hash table via an optimal-size determination.

FIG. 3 illustrates an example of a process 300 for creating a hash table via an optimal-size determination. In various embodiments, the process 300 can be performed as all or part of the block 210 of FIG. 2. The process 300 can be implemented by any system that can execute software applications. Although any number of systems, in whole or in part, can implement the process 300, to simplify discussion, the process 300 will be described in relation to the information handling system 100 of FIG. 1.

At block 302, the application 111 creates a first hash table with an initial capacity. In general, the block 302 can include instantiating the first hash table, for example, using initialization parameters such as an initial capacity and a load factor. The initial capacity can be, for example, a very large capacity deemed sufficient to cover most or all uses of the application 111. The first hash table can be created, for example, in the memory 104. At block 304, the application 111 populates the first hash table with runtime entries.

At decision block 306, it is determined whether the application 111 is ready to optimize hash table capacity. For example, in various embodiments, the application 111 may be ready to optimize at a point when the first hash table is deemed to be sufficiently populated (e.g., fully populated or mostly populated). In various cases, the first hash table may be deemed to be sufficiently populated as a result of the application 111 reaching a certain step or phase of an algorithm (e.g., a certain segment of code), a measurable slowdown to population of the hash table (e.g., deceleration), the passage of a certain amount of time, and/or other factors. If it is determined at the decision block 306 that the application 111 is not ready to optimize hash table capacity, the process 300 returns to block 304 and proceeds as described above. Otherwise, if it is determined at the decision block 306 that the application 111 is ready to optimize hash table capacity, the process 300 proceeds to block 308.

At block 308, the application 111 determines an improved hash table capacity. In certain embodiments, the improved hash table capacity may be calculable from a current number of entries in the first hash table. For example, in some implementations, the improved hash table capacity could be the current number of entries divided by a current load factor (e.g., 0.75). The improved hash table capacity can also be determined in other suitable ways.

At decision block 310, the application 111 determines whether a hash table resizing operation should occur. For example, in some embodiments, the decision block 310 involves the application 111 comparing the improved hash table capacity to a current capacity of the first hash table (which may be the initial capacity). In these embodiments, if the improved hash table capacity is greater than or equal to the current capacity, the application 111 may determine that a hash table resizing operation should not occur. It should be appreciated that the determination of whether a hash table resizing operation should occur can also be made in other suitable ways. If it is determined at the decision block 310 that a hash table resizing operation should not occur, the process 300 proceeds to block 312. At block 312, the application 111 continues to use the first hash table. At block 320, the application 111 stores an indicator of the improved hash table capacity in the application cache 132.

If it is determined at the decision block 310 that a hash table resizing operation should occur, the process 300 proceeds to block 314. At block 314, the application 111 creates a second hash table with the improved hash table capacity. In general, the second hash table can otherwise be created in similar fashion to the first hash table. At block 316, the application 111 copies each entry in the first hash table to the second hash table. At block 318, the application 111 uses the second hash table in place of the first hash table. In a typical embodiment, the application 211 allows portions of the memory 104 allocated to the first hash table to be reclaimed by the information handling system 100 (e.g., after garbage collection has occurred).

Advantageously, in certain embodiments, the improved hash table capacity enables hash table operations to be performed by the information handling system 100 faster and more efficiently. Moreover, overall performance and memory utilization by the information handling system 100 and by the application 111 can be greatly improved. At block 320, the application 111 stores an indicator of the improved hash table capacity in the application cache 132. The indicator can be, for example, the improved hash table capacity, a code or value from which the improved hash table capacity can be determined, and/or the like.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising, by a computer system comprising computer hardware:
initiating execution of an application in an execution environment of the computer system, the application utilizing a hash table data structure to map a plurality of keys to a plurality of values;
during the execution, the application checking a memory for a cached hash table capacity indicator from a previous run of the application in the execution environment;
responsive to no cached hash table capacity indicator being found in the memory:
creating a first hash table with an initial capacity;
populating the first hash table with a plurality of runtime entries;
determining an improved hash table capacity based, at least in part, on a quantity of the plurality of runtime entries, wherein the improved hash table capacity is a reduced capacity relative to the initial capacity;
creating a second hash table with the improved hash table capacity;
copying the plurality of runtime entries to the second hash table; and
the application using the second hash table in place of the first hash table.

2. The method of claim 1, comprising storing an indicator of the improved hash table capacity in the memory.

3. The method of claim 2, comprising updating the stored indicator during the execution of the application.

4. The method of claim 1, wherein the stored indicator comprises the improved hash table capacity.

5. The method of claim 1, comprising, responsive to at least one cached hash table capacity indicator being found in the memory:
creating a hash table with a capacity that is based, at least in part, on the at least one cached hash table capacity indicator; and
the application using the hash table during the execution.

6. The method of claim 1, comprising:
initiating a subsequent execution of the application in the execution environment;
during the subsequent execution, checking the memory for a cached hash table capacity indicator from a previous run of the application in the execution environment; and
responsive to the indicator of the improved hash table capacity being found in the memory:
creating a hash table with the improved hash table capacity; and
the application using the hash table during the subsequent execution.

7. The method of claim 1, wherein:
the application comprises an agent that instruments classes of a target computer program; and
the plurality of runtime entries comprise an entry for each class.

8. An information handling system comprising:
a processing unit, wherein the processing unit is operable to implement a method comprising:
initiating execution of an application in an execution environment of the information handling system, the application utilizing a hash table data structure to map a plurality of keys to a plurality of values;
during the execution, the application checking a memory for a cached hash table capacity indicator from a previous run of the application in the execution environment;
responsive to no cached hash table capacity indicator being found in the memory:
creating a first hash table with an initial capacity;
populating the first hash table with a plurality of runtime entries;
determining an improved hash table capacity based, at least in part, on a quantity of the plurality of runtime entries, wherein the improved hash table capacity is a reduced capacity relative to the initial capacity;
creating a second hash table with the improved hash table capacity;
copying the plurality of runtime entries to the second hash table; and
the application using the second hash table in place of the first hash table.

9. The information handling system of claim 8, the method comprising storing an indicator of the improved hash table capacity in the memory.

10. The information handling system of claim 9, the method comprising updating the stored indicator during the execution of the application.

11. The information handling system of claim 8, wherein the stored indicator comprises the improved hash table capacity.

12. The information handling system of claim 8, the method comprising, responsive to at least one cached hash table capacity indicator being found in the memory:
creating a hash table with a capacity that is based, at least in part, on the at least one cached hash table capacity indicator; and
the application using the hash table during the execution.

13. The information handling system of claim 8, the method comprising:
initiating a subsequent execution of the application in the execution environment;
during the subsequent execution, checking the memory for a cached hash table capacity indicator from a previous run of the application in the execution environment; and
responsive to the indicator of the improved hash table capacity being found in the memory:
creating a hash table with the improved hash table capacity; and
the application using the hash table during the subsequent execution.

14. The information handling system of claim 8, wherein:
the application comprises an agent that instruments classes of a target computer program; and
the plurality of runtime entries comprise an entry for each class.

15. A computer-program product comprising a non-transitory computer-usable medium having computer-readable program code embodied therein, the computer-readable program code adapted to be executed to implement a method comprising:
initiating execution of an application in an execution environment, the application utilizing a hash table data structure to map a plurality of keys to a plurality of values;
during the execution, the application checking a memory for a cached hash table capacity indicator from a previous run of the application in the execution environment;
responsive to no cached hash table capacity indicator being found in the memory:

creating a first hash table with an initial capacity;
populating the first hash table with a plurality of runtime entries;
determining an improved hash table capacity based, at least in part, on a quantity of the plurality of runtime entries, wherein the improved hash table capacity is a reduced capacity relative to the initial capacity;
creating a second hash table with the improved hash table capacity;
copying the plurality of runtime entries to the second hash table; and
the application using the second hash table in place of the first hash table.

16. The computer-program product of claim 15, the method comprising storing an indicator of the improved hash table capacity in the memory.

17. The computer-program product of claim 16, the method comprising updating the stored indicator during the execution of the application.

18. The computer-program product of claim 15, wherein the stored indicator comprises the improved hash table capacity.

19. The computer-program product of claim 15, the method comprising, responsive to at least one cached hash table capacity indicator being found in the memory:
creating a hash table with a capacity that is based, at least in part, on the at least one cached hash table capacity indicator; and
the application using the hash table during the execution.

20. The computer-program product of claim 15, the method comprising:
initiating a subsequent execution of the application in the execution environment;
during the subsequent execution, checking the memory for a cached hash table capacity indicator from a previous run of the application in the execution environment; and
responsive to the indicator of the improved hash table capacity being found in the memory:
creating a hash table with the improved hash table capacity; and
the application using the hash table during the subsequent execution.

\* \* \* \* \*